(12) United States Patent
Thiel et al.

(10) Patent No.: US 8,275,907 B2
(45) Date of Patent: Sep. 25, 2012

(54) ADDING INDIVIDUAL DATABASE FAILOVER/SWITCHOVER TO AN EXISTING STORAGE COMPONENT WITH LIMITED IMPACT

(75) Inventors: Gregory Thiel, Black Diamond, WA (US); Alexander R. Wetmore, Seattle, WA (US); Ayla Kol, Sammamish, WA (US); Rebecca Benfield, Seattle, WA (US); James Kleewein, Kirkland, WA (US); Naresh Sundaram, Redmond, WA (US); Yogesh Bansal, Redmond, WA (US); Mark Wistrom, Redmond, WA (US); Manoharan Kuppusamy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 290 days.

(21) Appl. No.: 12/146,518

(22) Filed: Jun. 26, 2008

(65) Prior Publication Data

US 2009/0327519 A1 Dec. 31, 2009

(51) Int. Cl.
*G06F 15/16* (2006.01)

(52) U.S. Cl. ........ 709/239; 709/202; 709/203; 709/218; 709/223; 709/228

(58) Field of Classification Search ................. 709/239, 709/202, 203, 218, 223, 228
See application file for complete search history.

(56) References Cited

U.S. PATENT DOCUMENTS

| | | | |
|---|---|---|---|
| 5,796,999 A | 8/1998 | Azagury et al. | |
| 5,951,695 A | 9/1999 | Kolovson | |
| 6,564,336 B1 | 5/2003 | Majkowski | |
| 6,772,363 B2 | 8/2004 | Pedone et al. | |
| 6,959,331 B1 * | 10/2005 | Traversat et al. | 709/222 |
| 7,003,694 B1 | 2/2006 | Anderson et al. | |
| 7,117,393 B2 | 10/2006 | Baba et al. | |
| 7,254,636 B1 * | 8/2007 | O'Toole et al. | 709/230 |
| 7,254,640 B2 | 8/2007 | Alexander | |
| 2003/0005028 A1 * | 1/2003 | Dritschler et al. | 709/104 |
| 2005/0015459 A1 * | 1/2005 | Gole et al. | 709/212 |
| 2007/0070975 A1 * | 3/2007 | Otani et al. | 370/351 |
| 2007/0168692 A1 | 7/2007 | Quintiliano | |
| 2007/0198700 A1 | 8/2007 | Vivian et al. | |
| 2007/0260696 A1 | 11/2007 | Bohannon et al. | |
| 2008/0109448 A1 * | 5/2008 | Aboel-Nil et al. | 707/10 |
| 2008/0313416 A1 * | 12/2008 | Frondozo et al. | 711/162 |
| 2009/0024722 A1 * | 1/2009 | Sethuraman et al. | 709/220 |
| 2009/0030986 A1 * | 1/2009 | Bates | 709/205 |
| 2009/0158081 A1 * | 6/2009 | Dake et al. | 714/3 |

OTHER PUBLICATIONS

Zheng, "Data Synchronization in a Replicated Distributed Database", Feb. 2007, University of Tampere.

(Continued)

*Primary Examiner* — Lan-Dai T Truong

(57) ABSTRACT

High availability architecture that employs a mid-tier proxy server to route client communications to active data store instances in response to failover and switchover. The proxy server includes an active manager client that interfaces to an active manager in each of the backend servers. State information and configuration information are maintained separately and according to semantics consistent with needs of corresponding data, the configuration information changing less frequently and more available, the state information changing more frequently and less available. The active manager indicates to the proxy server which of the data storage instances is the currently the active instance. In the event that the currently active instance is inactive, the proxy server selects a different backend server that currently hosts the active data store instance. Client communications are then routed to the different backend server with minimal or no interruption to the client.

19 Claims, 10 Drawing Sheets

OTHER PUBLICATIONS

Budrean et al., "High Availability Solutions for Transactional Database Systems", Proceedings of the Seventh International Database Engineering and Applications Symposium (IDEAS'03), IEEE Computer Society, IEEE, 2003.

Pedone, et al., "Pronto: A Fast Failover Protocol for Off-the-shelf Commercial Databases", 2000, IEEE.

* cited by examiner

ADDING INDIVIDUAL DATABASE FAILOVER/SWITCHOVER TO AN EXISTING STORAGE COMPONENT WITH LIMITED IMPACT

BACKGROUND

In a distributed application, a desktop application interacts with a server to receive various services. For example, in a messaging application (e.g., an email application), a client desktop receives messaging services. In a small company environment, a single server can be deployed to provide services for clients in a single location. As a company grows, a single server system is no longer sufficient to maintain a working messaging system under all conditions.

In a large scale enterprise-class messaging solution (e.g., a corporate email network), a number of server components are distributed geographically. Typically, a server is required for each geographic location and each server interacts with an associated database. The database can include mailboxes, addresses for all company users, stored email, stored attachments, etc.

Messaging services have become mission critical applications to many enterprises. As a result, failure handling requirements have increased to reduce messaging outages. However, a typical large scale messaging service architecture still exhibits characteristics of a single server solution in that one or more databases are typically associated with a single server. Thus, in the event of a failure of the server, access to its database(s) is also lost.

This system architecture creates difficulties in implementing individual database failover and switchover. If a single database fails, an outage results and a failover recovery operation is performed to recover the database. However, if a number of databases are also associated with the server, the failover operation creates an outage for users of those other databases. As messaging systems continue to evolve, such problems result from attempting to retrofit high availability support into existing "legacy" architecture.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

To that end, the disclosed architecture provides a high availability environment by including a proxy server which facilitates database failover (automatically switching to a redundant or standby server system or data instance) and switchover (manually switching to a redundant or standby server system or data instance) by detecting the failure, activating another instance, and redirecting clients to the active instance.

This is further facilitated by maintaining the state information separately from the configuration information. Both the state information and the configuration information are maintained using semantics that are consistent with the needs of the data. The state information tracks the online/offline state of databases and/or data servers and can change quickly and be easily updated. The configuration information, on the other hand, changes infrequently and is stored in a different repository for interaction by an administrator.

The proxy server receives state information as to which of the data storage instances is a currently active database. The proxy server connects the client(s) to the data server associated with the currently active database, and thereby provides rapid recovery after the failure to facilitate client access to the data. The proxy server leverages protocol indirection capabilities between the data storage layer and the client application to alter the connectivity. Examples of the type of changes include referrals provided by the data component, or initial configuration capabilities that discover the location of a mailbox, for example, using basic client information (e.g., e-mail address). This can aid in hiding the host location of an active database after a failover. The configuration information is altered to ensure that any data description information is not localized to a given data storage instance. This can require adding new objects to maintain the expected semantics of the configuration data.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
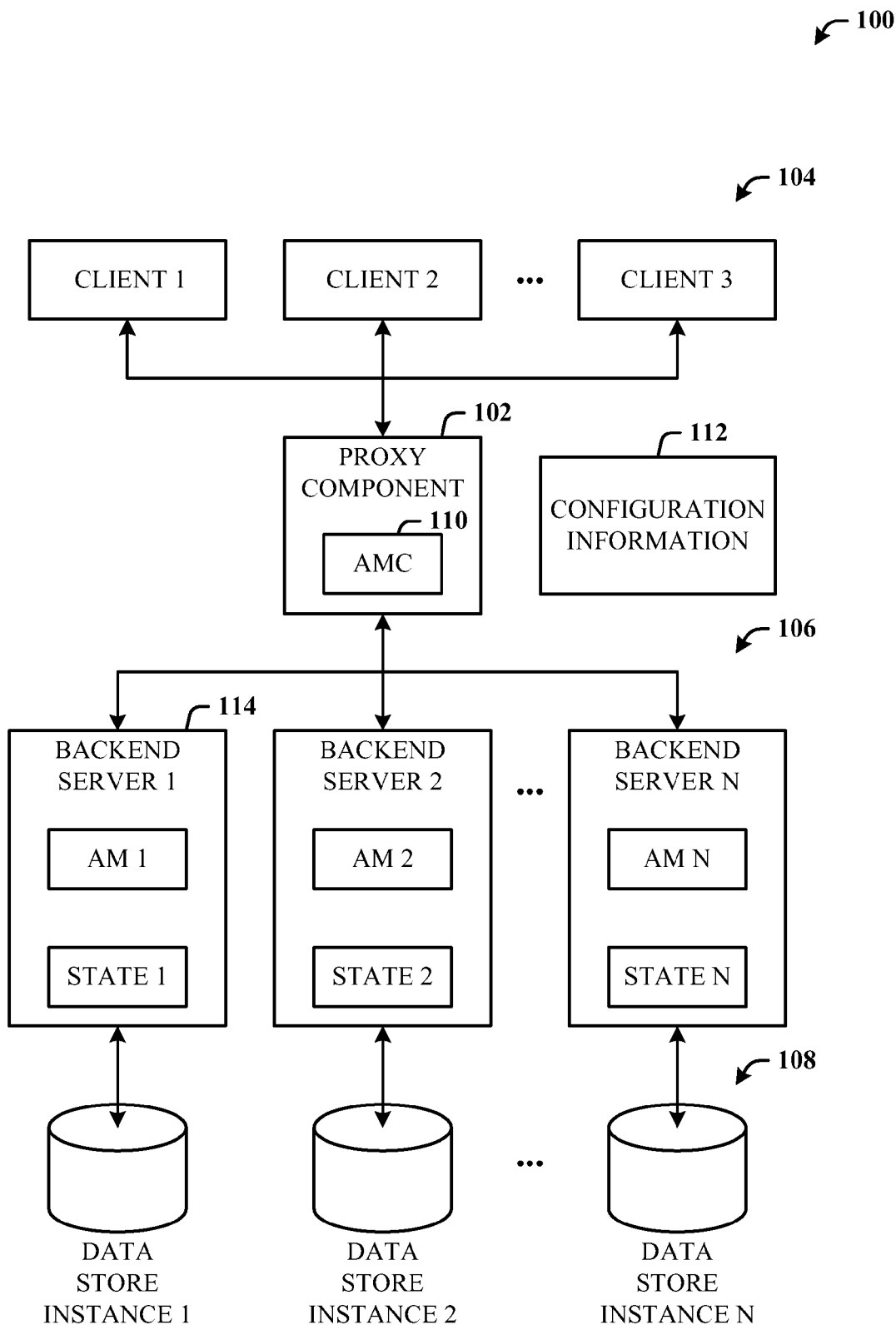
FIG. 1 illustrates a computer-implemented high availability data system for managing database failure.

The disclosed architecture relates to a computer-implemented high availability data system that accomplishes database failover and switchover in the event of a database failure. For example, the proxy server provides access to backend servers that connect to data storage instances. The architecture uses the proxy server in accordance with active/passive managed redundant databases. Clients connect to the proxy server rather than to the actual data storage component. The proxy server consults current state management functionality of a database (not the configuration information repository) to locate the active database, and connections are established from the proxy server to the database storage component.

This facilitates a much faster move from a failed or inactive data store instances to active data store instances than conventional architectures, which connect clients to such instances through a domain name server (DNS), for example. It can take hours to days to propagate such changes through DNS systems, a situation that is unacceptable for high availability systems; whereas, the proxy implementation described herein facilitates the move to the active data store instance with minimal or no loss in service.

In the context of messaging, for example, messaging clients connect to and are directed by the proxy server (and associated functionality) from a failed database instance to an active instance with imperceptible or no interruption to the clients. This is facilitated by state information and configuration information, which are maintained separately to accommodate potentially fast changing state of the backend servers and data store instances.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented high availability data system 100 for managing database failure. The system 100 not only provides high availability for new designs, but also for existing implementations. The system 100 includes a proxy component 102 for interfacing clients 104 to the correct backend servers 106, and then to the appropriate and active data store instances 108 in the event of a failover. This is accomplished by way of functionality included with the proxy component 102, which is described herein below.

The currently active database is one of the data store instances 108 selected based on state information that tracks the state of the data store instances 108. The data store instances 108 are redundant to each other, and are maintained together (via replication) to provide high availability services in the event that the currently active database (or instance) becomes unavailable. The backend server 106 provide access from the proxy component 102 (and ultimately the clients 104) to the desired one of the data store instances 108.

In support of this capability, the proxy component 102 includes an active manager client (AMC) 110. The backend servers 106 each include a software component referred to herein as an active manager (AM), and state information (STATE). The AMC 110 communicates with the AMs using any suitable protocol.

The same state information is redundant across the data store instances 108 of the backend servers 106. The AM (e.g., AM 1 of a first backend server 114) manages the state information. The state information provides at least the latest information as to the backend server that is hosting the active copy (or instance) of a database. The state information is stored separately from configuration information 112. This is because the configuration information changes infrequently and slowly, while the state information changes quickly to track the changing state of the backend servers 106 and associated instances 108. The configuration information 112 provides a means for identifying where the data store copies reside, and the state information (e.g., STATE 1 of the first backend server 114) for the instances 108 then indicates which of the instances 108 is active.

The proxy component 102 can be associated with a middle-tier ("mid-tier") server that connects the clients 104 to the currently active database (data storage instance). Note that the proxy component 102 does not maintain permanently persisted data.

The introduction of the proxy component 102 into the overall high availability architecture, the separation of the maintenance of the configuration from the maintenance of current state information (that provides the latest information on where the active copy of a database is hosted), the leveraging of any protocol indirection capabilities between the data storage layer and the client application to change the connectivity, and alteration of the configuration information to ensure that data description information is not localized to a given data storage instance, facilitate client connectivity to the proxy component 102 instead of the actual data storage instance. Examples of the type of connectivity changes are referrals provided by the data component or initial configuration capabilities that discover the location of a mailbox using basic client information (e.g., e-mail address). This can aid in hiding the host location of an active database after a failover.

The proxy component 102 consults current state management functionality of a database—not the configuration repository—to locate the active database. Connections are established from the proxy component 102 to the database storage instance. The state management component, the active manager, tracks which database copy is currently mounted, and is also responsible for managing failovers and switchovers of a database. The result is a high availability solution that provides granular recovery and rapid database failover without impact to client access. This is in contrast to past solutions that provided only server level failover and switchover support by manipulating TCP/IP identity information.

Figure 2:
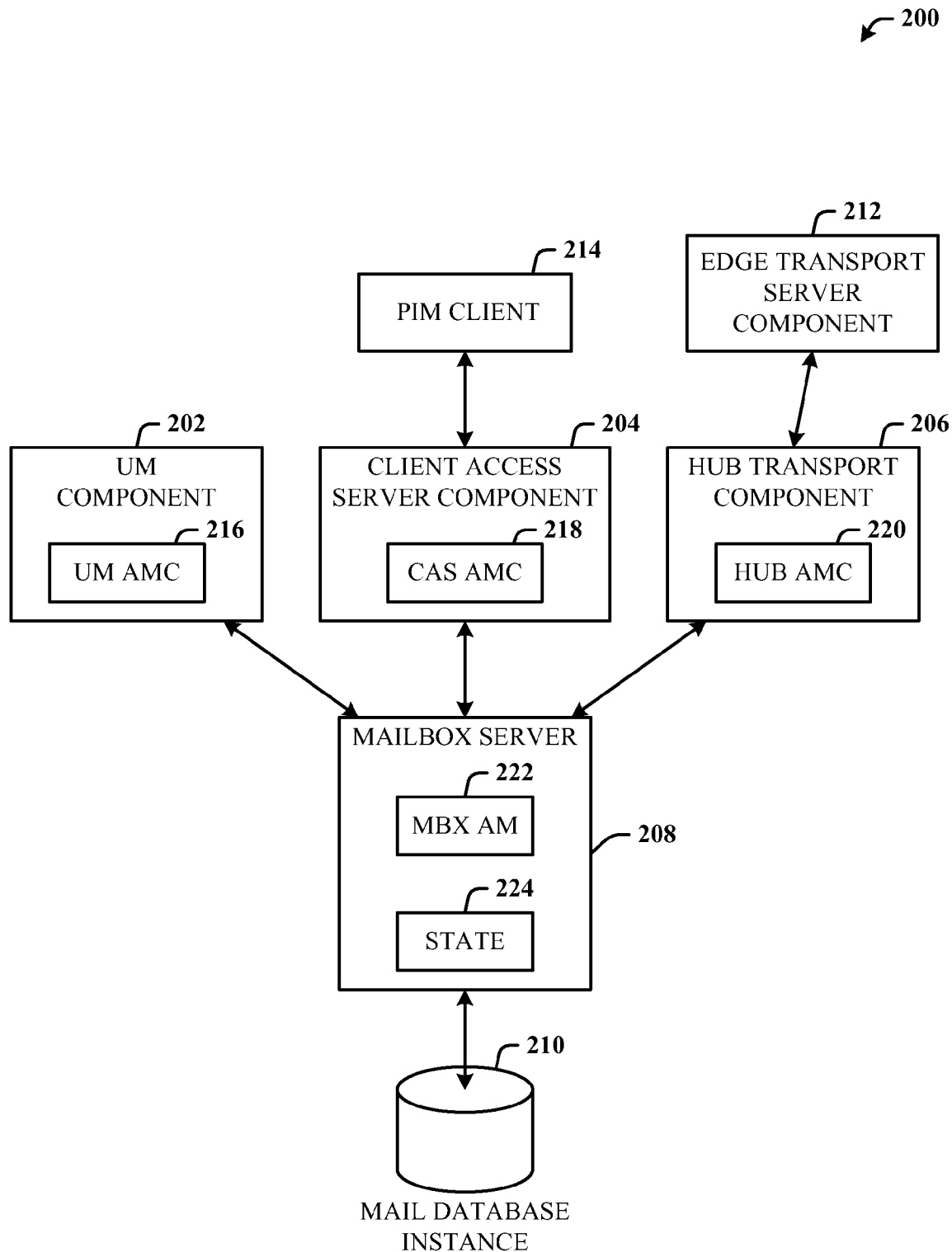
FIG. 2 illustrates an alternative embodiment of a high availability data system that is specific to a messaging environment.

FIG. 2 illustrates an alternative embodiment of a high availability data system 200 that is specific to a messaging environment. The system 200 shows how different communications server roles such as a unified messaging (UM) component 202 (for consolidating disparate messaging and communications technologies such as voicemail, email, facsimile, into a single service), a client access server (CAS) component 204 (for accepting connections from many different clients such as software clients that use POP3 and IMAP connections, and hardware clients such as mobile devices that can also connect using POP3 and IMAP), and a hub (HUB) transport component 206 interact with a mailbox server 208 to access a mail database 210.

The hub transport component 206 can provide routing within an organizational network, and can handle all mail flow, apply transport rules, apply journal rules, and deliver messages to recipient mailboxes. Messages sent to the Internet are relayed by the hub transport component 206 to an edge transport server component 212 that can be deployed on the perimeter network. Messages received from the Internet are processed by the edge transport server component 212 before relayed to the hub transport component 206.

A personal information manager (PIM) client 214 is shown for accessing the mailbox server 208 and the associated mail database instance 210. However, rather than interacting directly with the mailbox server 208 to access messaging data, as in conventional topologies, the PIM client 214 indirectly accesses the mailbox server 208 through the client access server component 204.

In support thereof, the UM component 202, client access server component 204, and hub transport component 206 become proxies (e.g., the proxy component 102) to connecting entities by the inclusion of the AMCs in each of these roles. For example, the UM component 202 includes a UM AMC 216, the client access server component 204 includes a CAS AMC 218, and the hub transport component 206 includes a hub AMC 220. In other words, each role that accesses the mailbox server 208 now has the active manager client API present in its role. Each AMC interacts with a mailbox server active manager (MBX AM) 222 on the mailbox server 208 to locate the active mail database instance 210 for a given database. To provide the associated database mobility the schema is changed to make a database be a peer object to a server. This incompatibility is masked to clients (e.g., PIM client 214) by creating a mailbox server-like object for the proxy functionality hosted on the mailbox server 208. A given database appears to be hosted on the server (e.g., CAS component 204) represented as the proxy. The mailbox server 208 is depicted as also including state information 224 that provides the state of all database instances.

Figure 3:
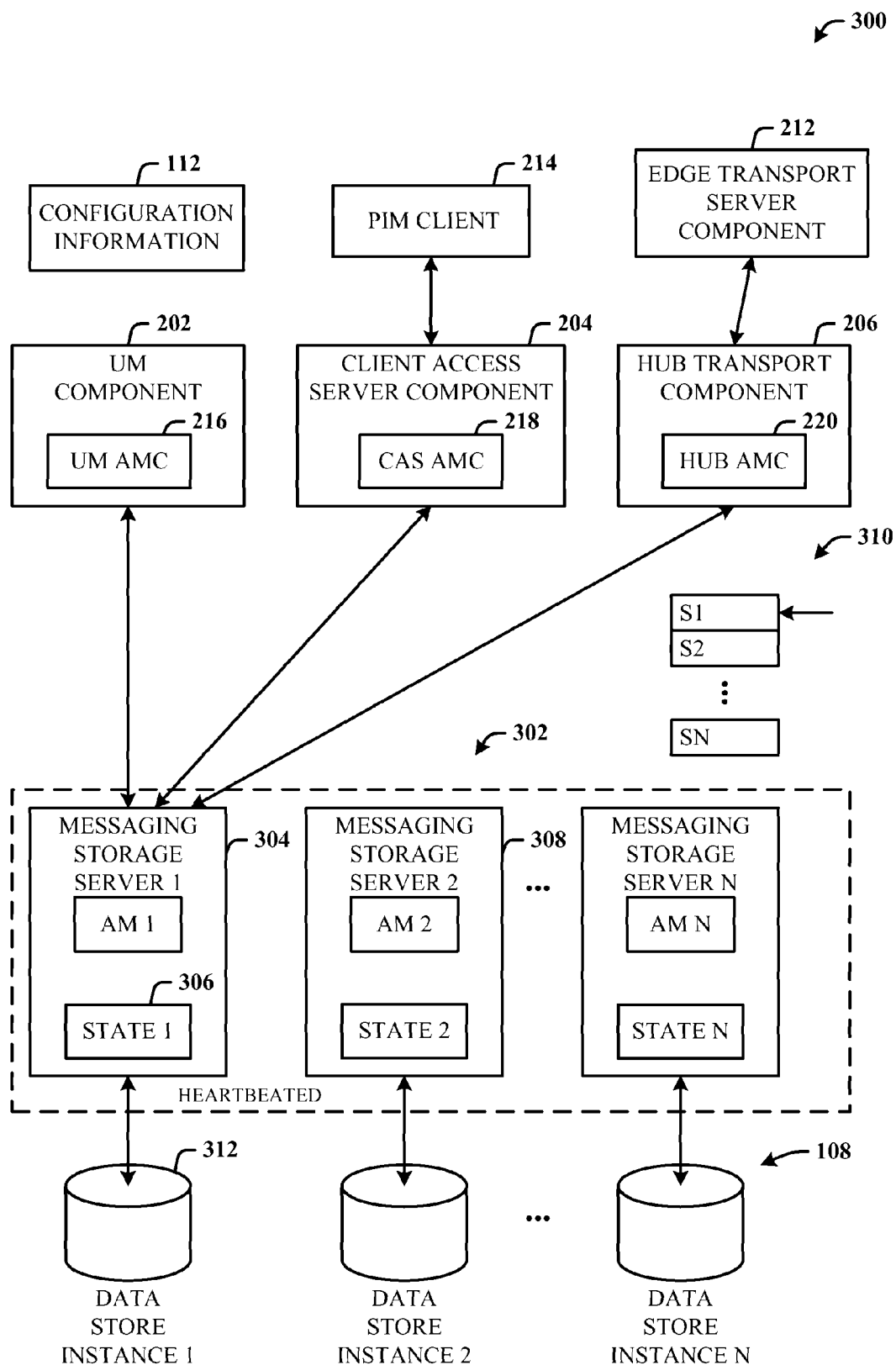
FIG. 3 illustrates a system that employs redundancy with database failover and switchover support.

FIG. 3 illustrates a system 300 that employs redundancy with database failover and switchover support. The system 300 shows redundancy (e.g., a cluster) in messaging storage servers 302 and data stores instances 108 associated with the messaging servers 302. The messaging storage servers 302 are shown as each having an active manager (AM) and are interconnected for heartbeat management. The messaging servers 302 operate as a group via basic clustering services such as quorum management and heartbeat monitoring (checking for offline servers and/or data store instances). The quorum management is a basic clustering service that operates to prevent a "split brain" scenario. In other words, a majority of the servers (or an appropriate alternative quorum strategy, e.g., non-majority) 302 need to be operational in order to start making decisions about activating other (passive) databases. This prevents the inappropriate activation of database copies.

The PIM client 214 interacts with one of the proxy servers (e.g., client access server component 204 using, e.g., messaging application program interface-MAPI) that uses the AMC to interact with the active managers (e.g., AM 1, AM 2, . . . , AM N) on the messaging storage servers 302. The CAS AMC 218 uses configuration information 112 to identify the correct messaging storage servers 302 to target AM queries. After receiving the configuration information for the current active database copy, the CAS component 204 (a mid-tier proxy) initiates the query to the designated messaging storage server 304. If the active copy has changed since the query completed and before the CAS component 204 connects, the designated messaging storage server 304 can check its state information 306 and return a referral to a different messaging server (e.g., a messaging storage server 308). This architecture provides multiple levels of protection to ensure the system 300 can effectively handle failures during any part of the interaction.

A new client may not have any awareness of where to connect. This can happen when a new system is being configured or when substantial failures have occurred. The system 300 handles this case by providing the client with a discovery mechanism based on the user's email address. This discovery mechanism can also be integrated with the AM to provide the necessary insight into the current state of the system. As previously indicted, the AMs also function as state managers (that reside on the messaging storage servers 302) to maintain current state information about which copy of the data storage instances 108 is currently providing service to the PIM client 214 (and other clients and entities).

A state table 310 indicates the state of the system 300, for example, state S1 (as illustrated) in which a first data storage instance 312 is the currently active database. Each table row can include one of N values, for the number of instances employed.

Figure 4:
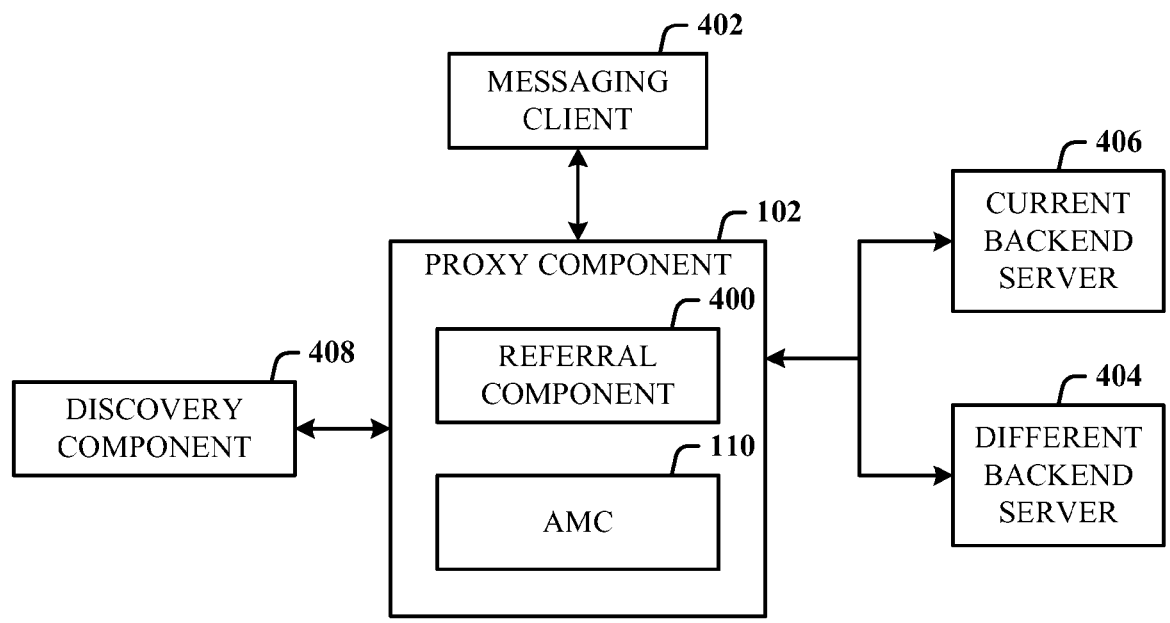
FIG. 4 illustrates an alternative embodiment of the proxy component.

FIG. 4 illustrates an alternative embodiment of the proxy component 102. The proxy component 102 can include a referral component 400 for connecting a messaging client 402 to a different backend server 404 (e.g., a messaging server) if a current backend system 406 becomes unavailable. In the event that the currently active database copy changes after a query is completed but before the proxy component 102 is connected, for example, the referral component 400 can detect this condition and, receive and return a referral to connect to the different backend server 404. Additionally, or alternatively, the referral component 400 can process a referral from the proxy component 102 such that the messaging client 402 is re-routed to the different backend server 404. This architecture provides multiple levels of protection to ensure effective handling of failures during any part of the interaction. In other words, the current backend system 406 can be contacted to serve a database, but then give back an answer that refers the contact to the different backend system 404.

Additionally depicted in FIG. 4, a discovery component 408 can be provided and utilized for designating a backend server for an unassociated messaging client, for example, the messaging client 402. The messaging client 402 can be unassociated, and therefore, unable to connect. This situation can occur when a new system is being configured or when major failures have occurred. In this scenario, the discovery component 408 can associate the messaging client 402 to its mailbox and the active database with that mailbox using, for example, a user's email address, based on correspondence with a related user group or enterprise branch location. The discovery component 408 can interface to the AMC 110 to obtain information regarding the current state of the backend systems.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
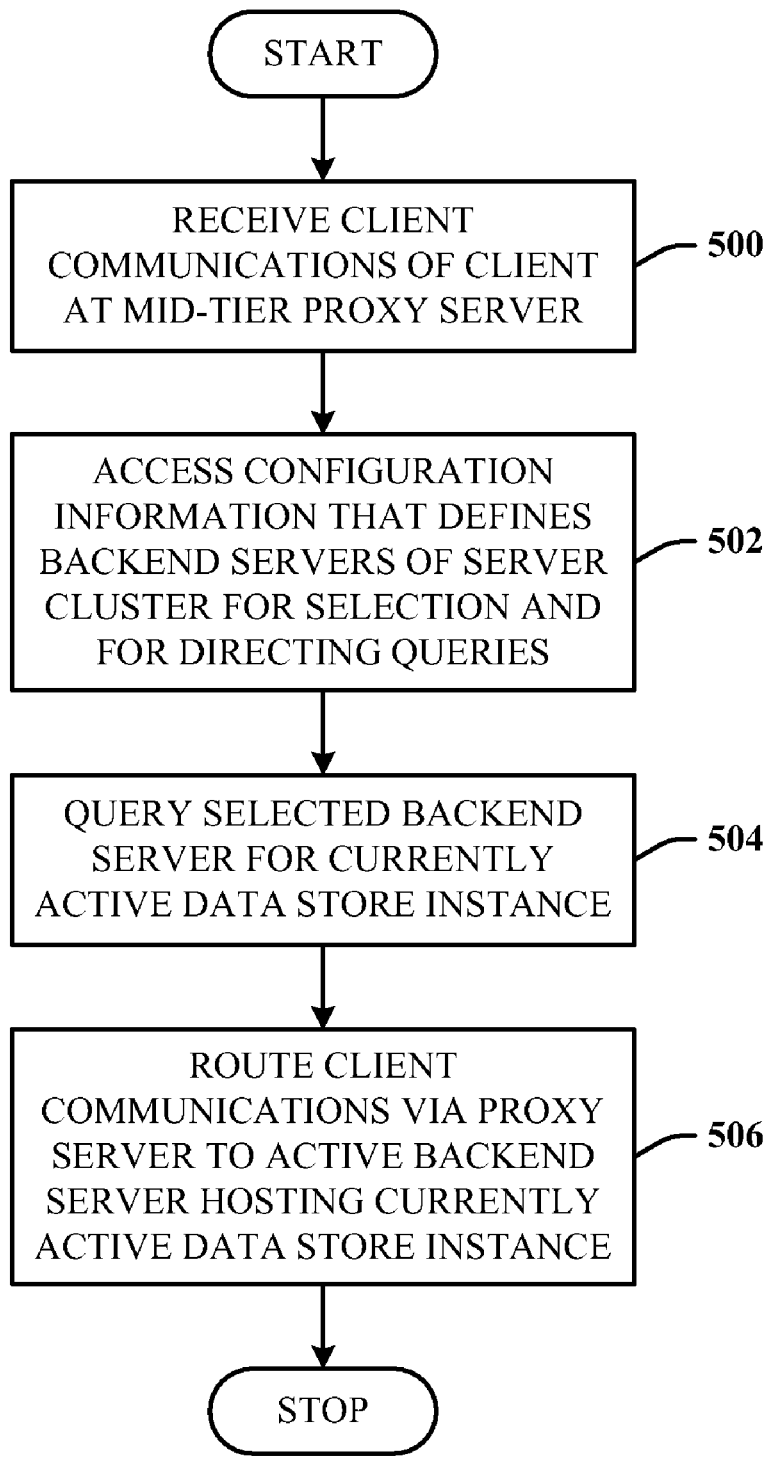
FIG. 5 illustrates a computer-implemented data method.

FIG. 5 illustrates a computer-implemented data method. At 500, client communications of a client are received at a mid-tier proxy server. At 502, configuration information is accessed that defines backend servers of a server cluster for selection and for directing queries. At 504, the selected backend servers are queried for a currently active data store instance. At 506, the client communications is routed via the proxy server to an active backend server hosting the currently active data store instance.

Figure 6:
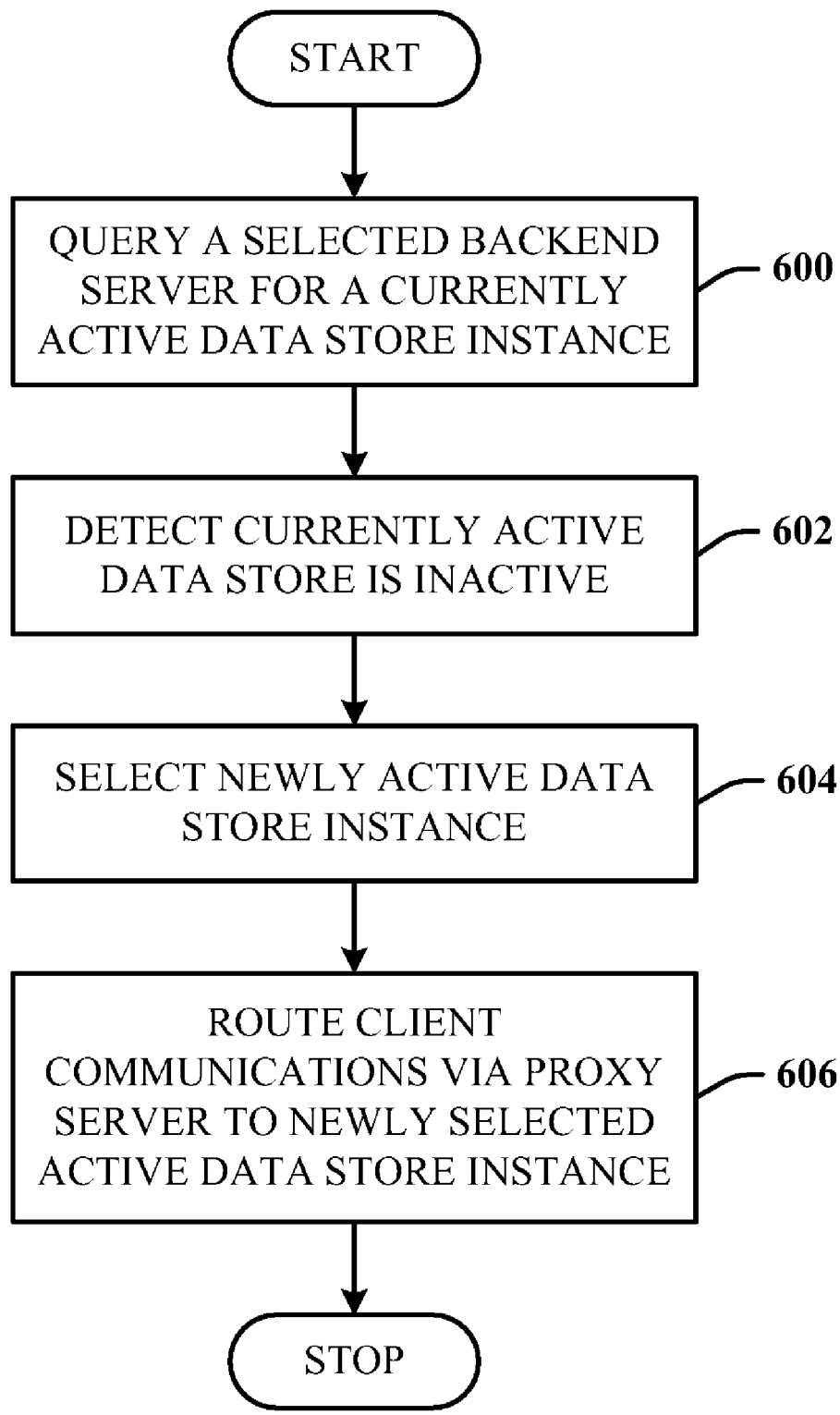
FIG. 6 illustrates a method of failover and switchover processing.

FIG. 6 illustrates a method of failover and switchover processing. At 600, a selected backend server is queried for a currently active data store instance. At 602, the currently active data store instance is detected as inactive. At 604, a newly active data store instance is selected. At 606, client communications are routed via the proxy server to the newly active data store instance.

Figure 7:
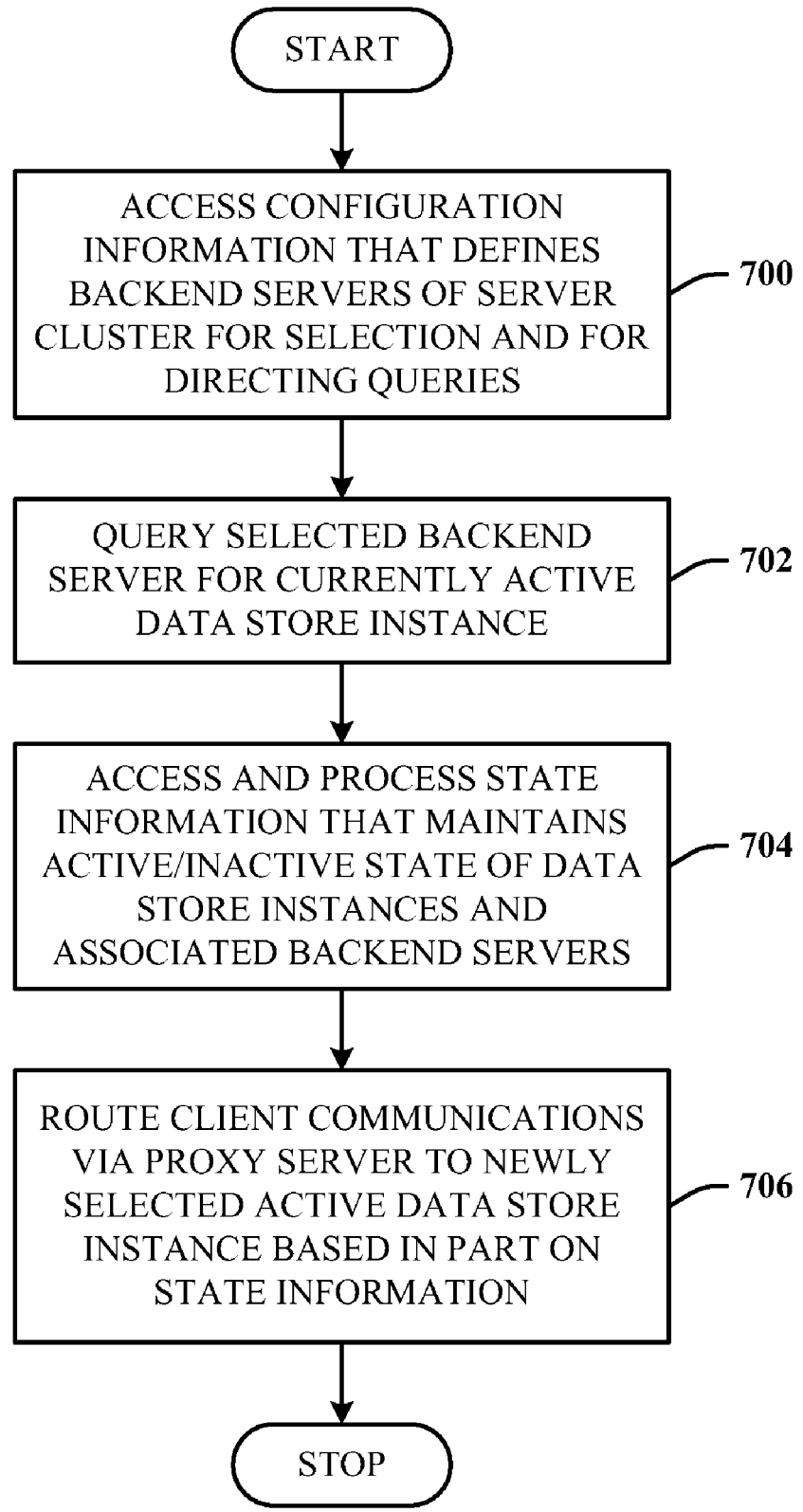
FIG. 7 illustrates a method of managing instance failover and switchover via information files.

FIG. 7 illustrates a method of managing instance failover and switchover via information files. At 700, configuration information is accessed that defines backend servers of a server cluster for selection and for directing queries. At 702, the selected backend servers are queried for a currently active data store instance. At 704, state information is accessed and processed that maintains active/inactive state of data store instances and associated backend servers. At 706, client communications are routed via proxy server to the newly selected active data store instance based in part on state information.

Figure 8:
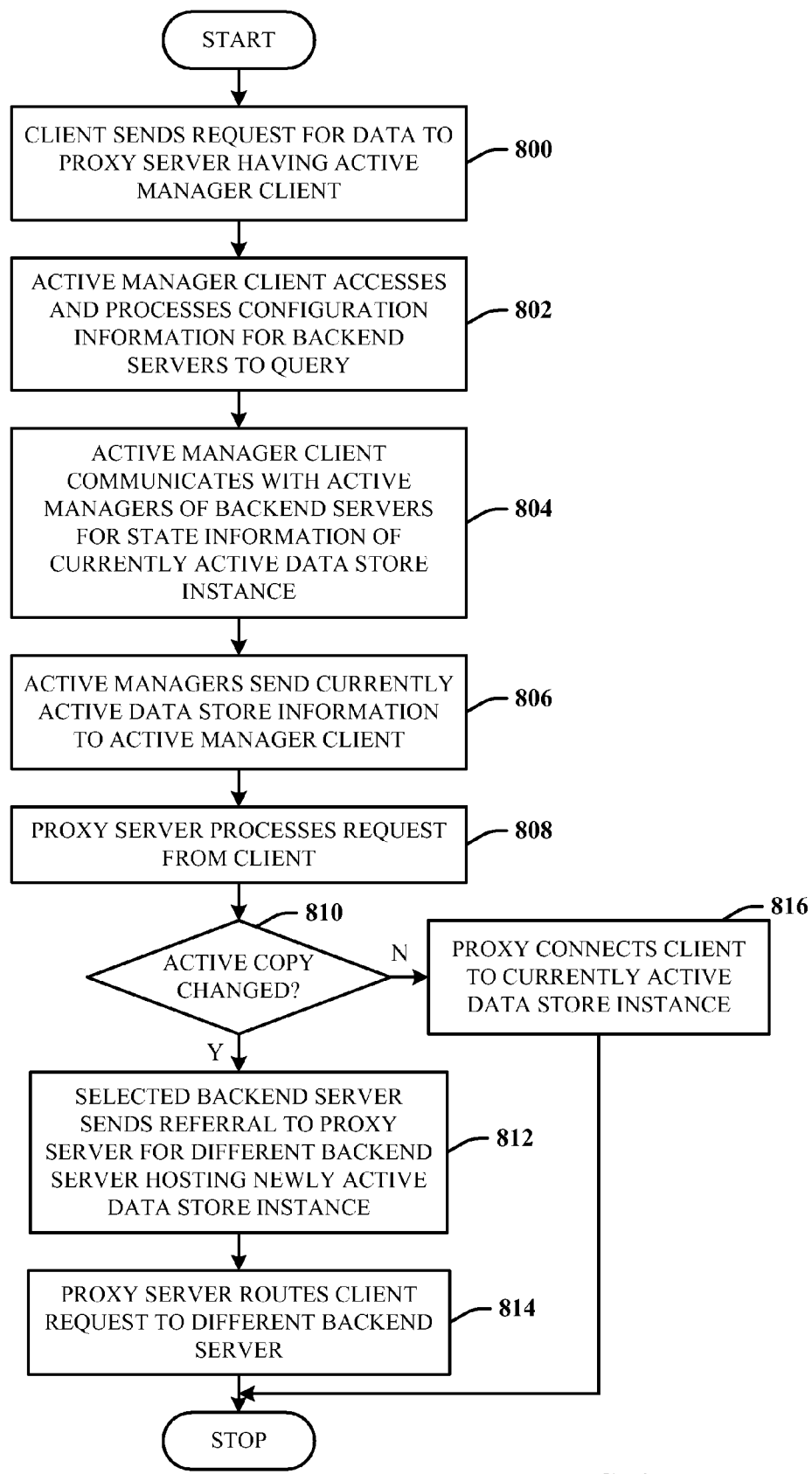
FIG. 8 illustrates a method of using a referral based on attempted connection of an inactive data store instance.

FIG. 8 illustrates a method of using a referral based on attempted connection of an inactive data store instance. At 800, a client sends a request for data to a proxy server having an active manager client. At 802, the active manager client accesses and processes configuration information for backend servers to query. At 804, the active manager client communicates with active managers of backend servers for state information of a currently active data store instance. At 806, the active manager sends the currently active data store information to the active manager client. At 808, the proxy server processes the request from the client to the currently active data store instance. At 810, if the active copy has changed, flow is to 812 where the selected backend server for the currently active data store instance sends a referral to the proxy server for a different backend server hosting the newly active data store instance. At 814, the proxy server routes the client request to the different backend server. At 810, of the active copy has not changed, flow is to 816 where the proxy server connects the client to the currently active data store instance.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
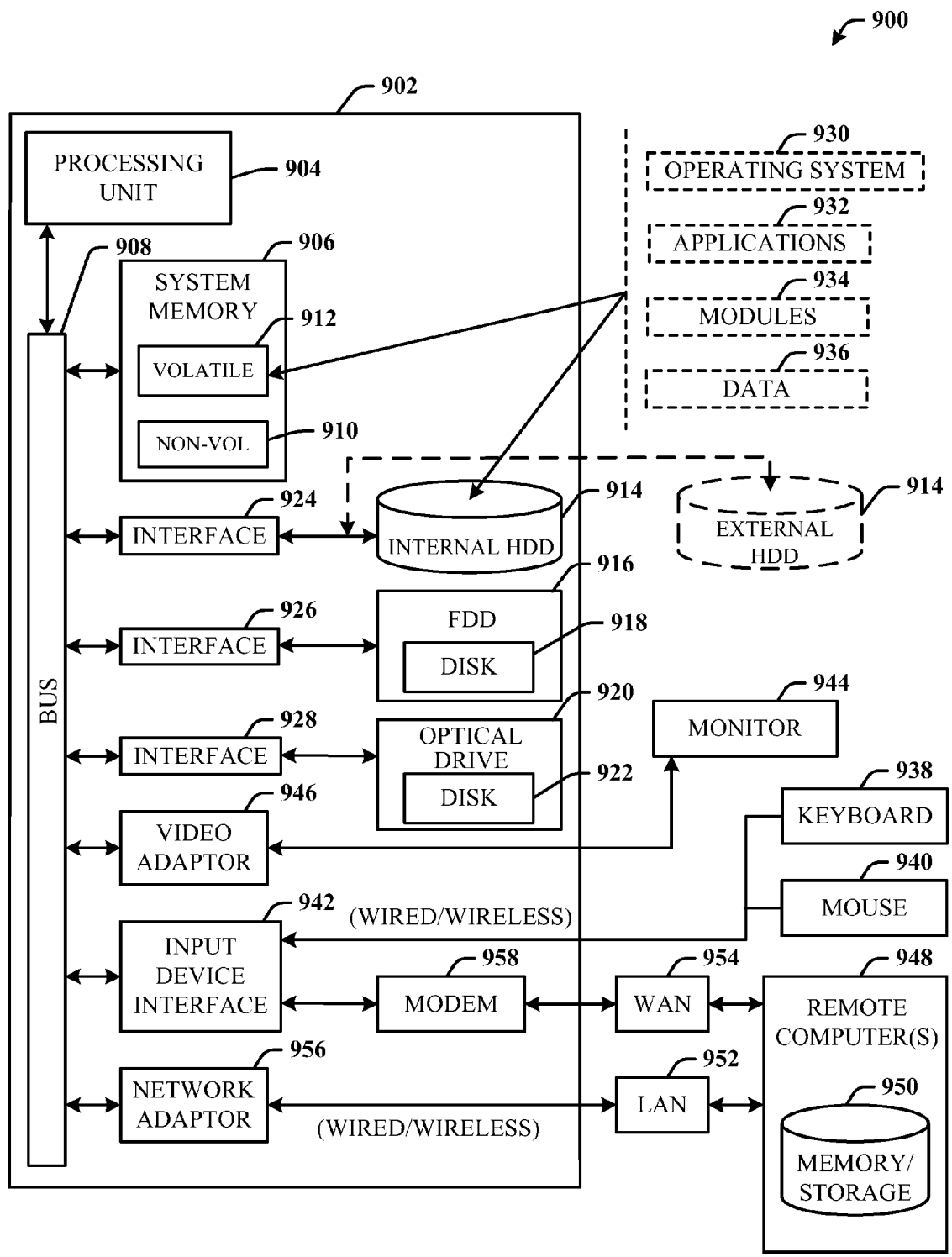
FIG. 9 illustrates a block diagram of a computing system operable to execute high availability failover and switchover in accordance with the disclosed architecture.

Referring now to FIG. 9, there is illustrated a block diagram of a computing system 900 operable to execute high availability failover and switchover in accordance with the disclosed architecture. In order to provide additional context for various aspects thereof, FIG. 9 and the following discussion are intended to provide a brief, general description of a suitable computing system 900 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902 having a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 can include non-volatile memory (NON-VOL) 910 and/or volatile memory 912 (e.g., random access memory (RAM)). A basic input/output system (BIOS) can be stored in the non-volatile memory 910 (e.g., ROM, EPROM, EEPROM, etc.), which BIOS are the basic routines that help to transfer information between elements within the computer 902, such as during start-up. The volatile memory 912 can also include a high-speed RAM such as static RAM for caching data.

The computer 902 further includes an internal hard disk drive (HDD) 914 (e.g., EIDE, SATA), which internal HDD 914 may also be configured for external use in a suitable chassis, a magnetic floppy disk drive (FDD) 916, (e.g., to read from or write to a removable diskette 918) and an optical disk drive 920, (e.g., reading a CD-ROM disk 922 or, to read from or write to other high capacity optical media such as a DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 912, including an operating system 930, one or more application programs 932, other program modules 934, and program data 936. All or portions of the operating system, applications, modules, and/or data can also be cached in the volatile memory 912. It is to be appreciated that the disclosed architecture can be implemented with various commercially available operating systems or combinations of operating systems.

Where the computer 902 is employed as a server machines, the aforementioned application programs 932, other program modules 934, and program data 936 can include the proxy component 102, the AMC 110, the configuration information 112, the backend servers 106, the active managers (AM), the state information, the edge transport server component 212, the UM component 202 and UM AMC 216, the client access server component 204 and CAS AMC 218, the hub transport component 206 and hub AMC 220, the mailbox server 208, the mailbox AM 222, the mailbox server information station 224, the messaging servers 302 and associated AMs and state, and state table 310, for example. This further includes the current backend server 406, the different backend server 404, referral component 400, and discover component 408, for example, and the methods of FIGS. 5-8.

Where the computer 902 is employed for a client system, application programs 932, other program modules 934, and program data 936 can include the clients 104, the PIM client 214, and the messaging client 402, for example.

A user can enter commands and information into the computer 902 through one or more wire/wireless input devices, for example, a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, etc.

A monitor 944 or other type of display device is also connected to the system bus 908 via an interface, such as a video adaptor 946. In addition to the monitor 944, a computer typically includes other peripheral output devices (not shown), such as speakers, printers, etc.

The computer 902 may operate in a networked environment using logical connections via wire and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, is connected to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3—related media and functions).

Figure 10:
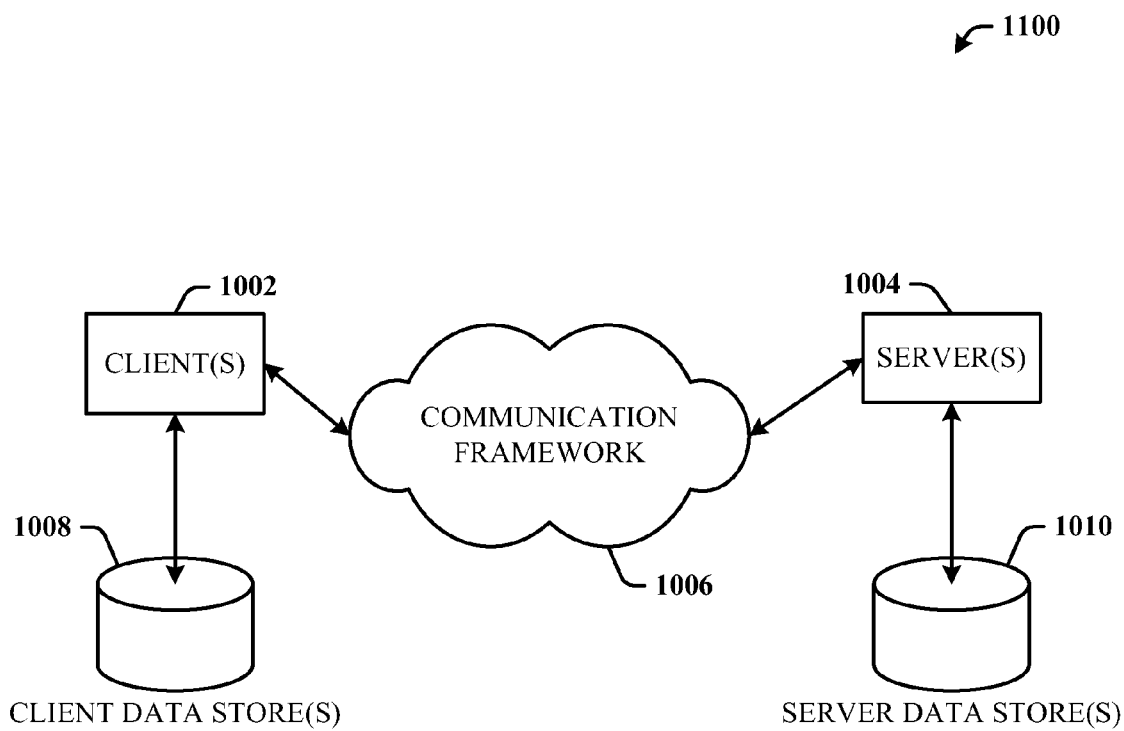
FIG. 10 illustrates a schematic block diagram of an exemplary computing environment that facilitates high availability failover and switchover in accordance with the disclosed architecture.

Referring now to FIG. 10, there is illustrated a schematic block diagram of an exemplary computing environment 1000 that facilitates high availability failover and switchover in accordance with the disclosed architecture. The environment 1000 includes one or more client(s) 1002. The client(s) 1002 can be hardware and/or software (e.g., threads, processes, computing devices). The client(s) 1002 can house cookie(s) and/or associated contextual information, for example.

The environment 1000 also includes one or more server(s) 1004. The server(s) 1004 can also be hardware and/or software (e.g., threads, processes, computing devices). The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The environment 1000 includes a communication framework 1006 (e.g., a global communication network such as the Internet) that can be employed to facilitate communications between the client(s) 1002 and the server(s) 1004.

Communications can be facilitated via a wire (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data system, comprising:
   a microprocessor;
   a proxy component arranged for execution by the microprocessor configured to route communications between clients and backend servers;
   configuration information configured to represent the proxy component as a data storage component that appears to host a plurality of associated backend data store instances, the representation facilitating high availability of data in response to failover at the backend servers; and
   an active manager client as part of the proxy component configured to identify a backend server based on the configuration information and retrieving state information from the backend server, the state information stored and maintained separately from the configuration information, the state information including status information of the backend servers and associated backend data store instances, and which one of the plurality of backend data store instances is a currently active backend data store instance, the currently active backend data store instance receiving the communications routed from the clients via the proxy component based on the configuration information and the state information retrieved from the backend server.

2. The system of claim 1, wherein the state information is stored and maintained separately from the configuration information.

3. The system of claim 1, further comprising the active manager client communicating to an active manager of the backend server to locate an active backend data store instance as part of failover and switchover.

4. The system of claim 1, wherein the proxy component discards session information of a communications session between a client and the backend server when the session ends.

5. The system of claim 1, wherein the backend servers and associated backend data store instances are made peer objects.

6. The system of claim 1, wherein the backend servers are messaging storage servers having associated message data store instances, and the proxy component connects the clients to an active message data store instance from an inactive message data store instance during failover.

7. The system of claim 1, further comprising a referral component for processing a referral from a backend mailbox server to which a client attempts to interact, or a referral from the proxy component to the backend mailbox server, the referral indicates a different backend mailbox server that hosts an active mail data store instance.

8. A computer-implemented data system, comprising:
   a microprocessor;
   a proxy component arranged for execution by the microprocessor configured to route communications between messaging clients and messaging storage servers;
   configuration information configured to represent the proxy component as a data storage component that appears to host a plurality of associated message data store instances, the representation facilitating high availability of data in response to failover at messaging storage servers; and
   an active manager client as part of the proxy component that identifies the messaging store servers based on the configuration information and communicates with activate managers of the messaging storage servers to locate an active message data store instance in response to failover and to retrieve state information, the state information stored and maintained separately from the configuration information, the state information including status information of the messaging storage servers and associated message data store instances, and which one of the plurality of message data store instances is currently the active message data store instance, the currently active backend data store instance receiving the communications routed from the messaging clients via the proxy component based on the configuration information and the retrieved state information.

9. The system of claim 8, the state information stored and maintained separately from the configuration information.

10. The system of claim 8, wherein the state information and the configuration information are maintained separately according to semantics consistent with needs of corresponding data, the configuration information changing less frequently and more available, the state information changing more frequently and less available.

11. The system of claim 8, wherein the active manager client facilitates activation of a new message data store instance and begins directing the clients associated with a hub transport component, a mid-tier client access component, unified messaging component to the new active message data store instance.

12. The system of claim 8, wherein the messaging storage servers each include an active manager that communicates with the active manager client, the active manager client uses the configuration information to find the messaging storage servers and to direct queries to the associated active managers for the active message data store instance.

13. A computer-implemented data method for facilitating high availability of data in response to failover at the backend servers, comprising:
   receiving client communications of a client at a mid-tier proxy server;
   accessing, by a microprocessor, configuration information that defines backend servers of a server cluster for selection and for directing queries, and represents the mid-tier proxy server as a data storage component that appears to host one or more data store instances;
   identifying the selected backend servers based on the configuration information;
   querying the selected backend servers for a currently active data store instance;

routing the client communications via the mid-tier proxy server to an active backend server hosting the currently active data store instance; and retrieving state information from the active backend server, the state information stored and maintained separately from the configuration information, the state information maintaining active and inactive states of data store instances and associated backend servers, the currently active data store instance receiving the routed client communications via the proxy component based on the configuration information and the state information retrieved from the backend server.

14. The method of claim 13, further comprising:
detecting that the currently active data store is inactive; and
routing the client communications to a newly selected active data store instance.

15. The method of claim 13, further comprising:
routing the client communications to the newly selected active data store instance based in part on the state information.

16. The method of claim 15, further comprising the state information and the configuration information maintained according to semantics consistent with needs of corresponding data, the configuration information changing less frequently but more available than the state information, which changes more frequently relative to the configuration information.

17. The method of claim 13, further comprising receiving a referral from a selected backend server to route the client communications to a different backend server, and routing the client communications to the different backend server.

18. The method of claim 13, wherein the mid-tier proxy server includes one of a hub transport role, a unified communications server role, or a client access server role.

19. The method of claim 13, further comprising representing the mid-tier proxy server as the data storage component in the configuration information to provide high availability failover and switchover of data stores instances associated with the backend servers.

* * * * *